UNITED STATES PATENT OFFICE.

JOHN AUGUSTUS JUST, OF SYRACUSE, NEW YORK; ANNIE L. JUST AND BENJAMIN STOLZ EXECUTORS OF SAID JOHN AUGUSTUS JUST, DECEASED.

PROCESS OF UTILIZING DRIED MILK.

939,138.     Specification of Letters Patent.     Patented Nov. 2, 1909.

No Drawing.     Application filed August 20, 1907. Serial No. 389,327.

*To all whom it may concern:*

Be it known that I, JOHN AUGUSTUS JUST, a citizen of the United States, residing at Syracuse, in the county of Onondaga and State of New York, have invented certain new and useful Processes of Utilizing Dried Milk; and I do hereby declare the following to be a full, clear, and exact description of the same, such as will enable others skilled in the art to which it appertains to make and use the same.

This invention relates to processes of utilizing dried milk; and it comprises a method of reconstituting milk from dried milk and of forming milk products of the usual taste or flavor, aroma and properties from such dried milk; all as more fully hereinafter set forth and as claimed.

Dried powdered milk has become a staple article of commerce as it contains all the nutritive values of the milk from which it was made in a much less volume and weight; as it is perfectly permanent and practically germ-free, and as, when made by modern methods, as for instance by sharp-drying milk on rotating cylinders heated to a temperature above 100° C., it is soluble in water and is readily applicable to domestic and culinary purposes. By using such modern methods, dried milk can readily be made in enormous quantities when milk is plentiful, as in spring and summer, and stored for use when milk is not so plentiful, as in winter. But it is found that in practice, the milk reconstituted from such dried milk by the simple addition of the requisite amount of water differs somewhat from the original milk in flavor, aroma and properties. As a rule, these differences are ascribed to changes in the milk albuminoids incident to the drying operation; but I have discovered this explanation not to be true; at least to any material extent. In part the changes appear to be due to simple loss of the natural volatile, aroma-giving constituents found in the milk as it is ordinarily used, probably by volatilization during the drying operation; that is, the milk loses other volatiles than water during the drying operation. Part of the difference in flavor is probably due to this loss of aroma-giving constituents and the residue to certain chemical changes in other constituents than proteids during the drying.

As is well known, the flavor and aroma of milk as it ordinarily appears on the table are not those of the absolutely fresh milk as it is drawn from the udder. The latter has a "flat" flavor and aroma which are not as well liked as the flavor and aroma which appear after the milk has stood for awhile, as in the customary interval between milking and consumption of the milk. The " acquired " taste and odor, I have discovered, are largely, if not entirely, due to the sapid and volatile products and by-products developed in the ordinary fermentative actions which take place in milk after leaving the udder and which, up to the point where the milk becomes noticeably sour, that is develops a substantial amount of acidity, are distinctly desirable. Many species of bacteria and other micro-organisms probably take part in these fermentative actions; some producing lactic acid and some not. The milk within the udder appears to be absolutely sterile and bacteria-free, but in passing through the milk ducts it becomes inoculated from the bacterial flora naturally present therein. Fresh-drawn milk, before the inoculating organisms have had time to develop, has of course the flavor of the sterile milk within the udder, but after the milk has remained the usual length of time before reaching the table of the consumer, these organisms have had time to develop and the milk acquires the usual flavor of table milk. This usual flavor is, however, again destroyed and the organisms producing it are killed, in the heating incident to desiccation in forming milk powder. The " acquired " aroma and flavor of natural " aged " milk are not found therefore in the milk reconstituted from dried milk by the ordinary methods. Such reconstituted milk while possessing a pleasant aroma and flavor is still different in both respects from natural milk which has been " aged " slightly. Nor does such milk on standing acquire the ordinary flavor of table milks, since though it is usually soon infected with microorganic life, the accidental organisms which find access to it are not ordinarily those natural to milk and do not produce the same results as these natural organisms.

It is one of the objects of the present invention to restore to reconstituted milk, and to products made from it, the ordinary "acquired" aroma and flavor of ordinary table milk. The ordinary reconstituted milk further differs from natural milk in that it is not readily caseified; on addition of rennet it does not give the ordinary agglutinating curd necessary for cheese-making and like purposes and for the production of junkets and similar products. This fact is probably due both to chemical changes in the milk incident to desiccation and to the absence of the natural organisms of milk and of their products. Rennet coagulates such reconstituted milk but slowly. In certain experiments which I have made, I prepared a rennet extract by shaking one gram of rennet powder with 20 cc. of water for 2 minutes and filtering. Addition of 0.5 to 3 cc. of this extract to 20 cc. of fresh ordinary milk kept at 38° C., gave the ordinary conglutinating coagulum after 5 minutes while the same quantity of the rennet extract added to reconstituted milk of the same strength and at the same temperature in the same time gave a mass of the consistency of a crumbly cream without forming a conglutinating coagulum of the nature of that desired for cheese making. While a curd of this crumbly consistency is desirable in making some articles for direct consumption, it is not well adapted for cheese making.

To some extent though not altogether, reconstituted milk made by the simple solution of dried milk resembles boiled milk in its relations to rennet; particularly if the milk has been heated to a temperature over 100° C., as in some methods of sterilizing. Natural milk heated to 100° C., for 5 minutes is coagulated by rennet only after about 35 minutes' action; after 60 minutes' heating, 2 hours are required for coagulation, and after one hour's heating to a temperature of 120° C., milk does not coagulate with rennet even in 5 hours. Even when milk to be dried is not preliminarily neutralized more or less as it usually is, the dried product is found to be somewhat different in reaction upon litmus or other test paper from the original milk. In the reconstituted milk from dried milk there also appears to be a slight change in, or diminution of, the soluble calcium salts. It is to these phenomena that the reluctance to caseification of reconstituted milk made from dried milk appears to be due, and upon allowing a little fermentation in it, with resultant production of fermentation products, and by adding a small amount of a soluble calcium salt, such as calcium chlorid, the reconstituted milk becomes susceptible to caseification in the ordinary manner, yielding to rennet like natural milk and producing cheese in like manner.

A slight degree of fermentation, with its incident formation of soluble sapid substances and volatile odoriferous substances appears to be more important in restoring the original flavor and aroma to reconstituted milk than is the addition of soluble calcium salts while in caseification or cheese making the relative importance of the two operations is the reverse. That is, a reconstituted milk can be given very nearly the original flavor and aroma, or even a better, by institution of a suitable fermentation therein without addition of calcium salts while a cheese may be made from the reconstituted milk without any fermentation at all by simply adding a small amount of a soluble calcium salt prior to treating with rennet though a better curd is given by the milk after a slight fermentation. But both operations are desirable in restoring to the reconstituted milk the full flavor and aroma and the constitution of the natural milk, and in producing therefrom junket, cheese and other products intended to have the flavor and aroma of those made from natural milk. I therefore preferably, though not necessarily, perform both operations.

Milk powder being made at the relatively high temperatures customary in the art, is generally practically sterile though offering a suitable pabulum for the growth of any of the ordinary bacteria and yeasts found in natural milk. To produce a desirable type of fermentation therefore and avoid the fermentations due to accidental inoculations, it is generally necessary to inoculate it artificially with the desired organisms. In practice, the fact of this sterility is advantageous since it enables the use of selected organisms adapted to produce desirable aromas and flavors in lieu of the ordinary medley of organisms found in natural milk; that is, the reconstituted milk and its products may be given the flavor and aroma of the best natural milk and milk products in lieu of the flavor and aroma of ordinary natural milk and milk products.

Various bacteria are known which produce good aromas and which produce good flavors. Various lactic organisms produce good flavors in addition to producing lactic acid, though a good flavoring organism does not necessarily also produce lactic acid. Of the aroma-producing organisms, not many also yield lactic acid. The flavor-producing organisms appear to be more numerous than the aroma-producing kinds, but there is not much definite knowledge as to either. A bacillus producing unusually good aromas has been isolated by Prof. Conn and is usually known merely by the number he gave it, "No. 41". This is a very suitable organism for inoculating reconstituted milk, but its action should ordinarily, though not necessarily, be supplemented by that of another organism yielding more sapid products.

A pure culture, or pure cultures, of the desired bacteria or kinds of bacteria, may be directly used for inoculating the reconstituted milk, but ordinarily, in order to secure a mass of organisms for the treatment and save time, it is preferable to employ a relatively large amount of an inoculating liquid. Such a liquid may be made from a separate quantity of reconstituted milk or from skim milk. In the latter event, the skim milk must first be pasteurized, its temperature being kept for a time at 70° to 75° C., and gradually reduced under gentle agitation to 65° to 69° C. It should be kept at the latter temperature for 30 minutes. It is convenient to keep the vessel containing the milk in a water bath, adding boiling water to the latter whenever the temperature begins to sink. After elapse of the 30 minutes, the pasteurized milk is cooled by placing the containing vessel in cold or iced water, the cooling being stopped as soon as the temperature of the milk reaches 20° to 25° C. unless the air be unduly warm, in which case the cooling may be advantageously carried to 15° to 20° C. The pure culture is now added to the milk and the fermentation allowed to proceed until such milk becomes thick or creamlike in consistency, when it is ready for use as an inoculating fluid. Reconstituted milk, owing to its practical sterility does not require so much care in pasteurization.

For treating reconstituted milk to be flavored and given aroma, a small amount of this inoculating fluid is all that is required, from a half to four per cent. being ordinarily sufficient. This offers a marked economy over the use of pure cultures of the ordinary types. The inoculating fluid also has the advantage of permitting the use of mixtures of organisms of various types, since it may be initially treated with a plurality of pure cultures to produce a "mixed culture." In using such a mixed culture it is ordinarily advantageous that one of the initial cultures shall be that of the stated bacillus "No. 41" of Prof. Conn. With it in mixed cultures may be advantageously employed a lactic acid forming, flavor-producing organism. Inoculating fluids made from bacillus 41 alone may be advantageously used for making milk and cream with a pure aroma. With this bacillus, the milk for making the inoculating fluid should be heated several times a day for three or four days by passing steam into it, or be otherwise fractionally sterilized. During growth, a temperature around 23° C. is advantageous. After once producing the inoculating liquid from the ordinary pure cultures, it may be used to produce fresh inoculating liquid, until the action begins to weaken, which may not be for six to seven weeks. When this happens it is best to produce a fresh lot from pure cultures. Since bacillus No. 41 does not produce acid, when reconstituted milk is treated with an inoculating fluid produced from it alone, the milk will not readily sour, and it may be kept for long periods.

In natural milk in addition to the aroma producing organisms and the lactic bacteria, there are also certain other organisms which have a distinctive action upon proteids, liquefying and peptonizing them and which in growth affect casein, producing sapid products and, probably, also affecting the later cheese-making operations when cheese is made. In producing natural flavors, therefore, it is frequently desirable to introduce these casein gelatinizing or gelatin-liquefying organisms together with the aroma-producing and flavor producing organisms; especially where the reconstituted milk is to be used to produce cheese.

While dry pure cultures, suitably diluted with lactose or other diluent, may be directly added to the dried milk before dissolving to produce reconstituted milk this is not so convenient as first making the reconstituted milk and then adding the culture or the inoculating fluid.

In treating the reconstituted milk, it is brought to a temperature of about 18° to 24° C. before treatment and inoculated with the inoculating fluid or the pure culture. Fermentation is allowed to take place and continue at this temperature until the desired aroma and flavor are produced. Low temperatures give a slow evolution of flavor and aroma while a gradually elevated temperature will shorten the time required. From 3 to 12 hours' treatment with fermentation organisms are required at temperatures between 18° and 35° C., the time and temperature required depending on the particular organisms employed and the nature and purity of the reconstituted milk, or milk powder milk. After the fermentation has gone to the extent desired, the milk, if to be used as a substitute for, or in the same way as, ordinary natural milk may be treated in the same way. The fermentation should be but slight and not enough to produce any noticeable acidity, fermentation being arrested at about the point where the reconstituted milk has about the taste and properties of ordinary table milk and is still "sweet." On chilling, the fermentation will be arrested in the same way as in chilling natural milk, and the chilled reconstructed milk will keep in the same way and for as long a period as such chilled natural milk. Except for a slight difference in the character of the soluble calcium salts, it is the same thing as the best grades of ordinary fresh milk.

Flavor, aroma, composition and properties may be made exactly the same as that of the best grades of ordinary fresh milk by the addition of a small amount of a soluble calcium salt, such as calcium chlorid, before, during or after the described fermentation.

For cheese-making a reconstituted milk giving a good, well-flavored cheese may be obtained by adding such calcium salt directly to the solution formed by dissolving dried milk, but here also in order to obtain the full ordinary flavor and aroma of the product it is desirable to employ a slight preliminary fermentation carried to the point of giving the milk the correct aroma and flavor. I find that though such calcium salts assist rennet to produce a conglutinating curd from reconstituted milk, by themselves, or at least in the proportions which I ordinarily use, they have no substantial coagulating or curd making power.

As a preferred example of my complete process, I may take a thousand pounds of ordinary commercial dried milk powder and dissolve it in a thousand gallons of water. To this solution I add from half a per cent. to four per cent. of an inoculating fluid, made as described, and allow the mixture to stand at a good growing temperature, say 24° to 35° C. for 3 to 12 hours. This will result in a reconstituted milk having the creamy flavor and aroma of natural milk and not the more insipid taste and odor of ordinary reconstituted milk. This reconstituted milk may then be consumed as it is, the fermentation organisms being of course harmless, or it may be chilled and stored in the same way as ordinary milk. The chilling will at once arrest the fermentation at the desired point. To the flavored, aromatized reconstituted milk, in the amount given, may now be added 112 to 336 grams of calcium chlorid. Other calcium salts may be used, but this is perfectly suitable. This somewhat improves the flavor and gives the milk the power of caseification with rennet. When so desired, the fermentation may be omitted and the calcium salt directly added to the reconstituted milk as soon as formed. Such milk will then give cheese. But I prefer to employ both operations.

In making cheese from the reconstituted milk after addition of the calcium salt, with or without the flavor-giving fermentation, I bring the solution to a temperature of 29° to 33° C., add the usual amount of rennet or rennet extract, thoroughly mix and allow to stand until caseification is complete. After coagulation, the temperature is raised to about 38° C. or more to harden the curd and allow a better separation of whey. The curd is cut to allow better drainage. With the whey will generally pass away the bulk of the calcium salt used. When the curd is fully drained, it is worked in molds, pressed, prepared and ripened in the usual way.

In lieu of specially prepared cultures, good flavored sour milk may be used for inoculating the reconstituted milk to institute fermentation, but as its bacterial flora is apt to be rather uncertain, it is generally preferable to employ an inoculating fluid or a pure culture in the manner set forth.

What I claim is:—

1. In the manufacture of milk products, the process of forming a reconstituted milk which consists in dissolving dried milk in water, inoculating the solution with suitable fermentative organisms, allowing the inoculated solution to stand at a suitable growing temperature until a creamy flavor and aroma like that of table milk develop, and arresting the fermentation at this point before any substantial amount of acid is formed.

2. In the manufacture of milk products, the process of forming a reconstituted milk which consists in dissolving dried milk in water, inoculating the solution with aroma-producing organisms, allowing the inoculated solution to stand at a suitable growing temperature until a creamy aroma like that of table milk develops, and arresting the fermentation at this point before any substantial amount of acid is formed.

3. In the manufacture of milk products, the process of forming a reconstituted milk which consists in dissolving dried milk in water, inoculating the solution with aroma-producing organisms and lactic organisms, and allowing the inoculated solution to stand at a suitable growing temperature until a creamy aroma and flavor like that of table milk develop and arresting the fermentation at this point before any substantial amount of acid is formed.

4. In the manufacture of milk products, the process of forming a reconstituted milk which consists in dissolving dried milk in water, inoculating the solution with suitable fermentative organisms, allowing the inoculated solution to stand at a suitable growing temperature until a creamy aroma like that of table milk develops, and arresting the fermentation at this point before any substantial amount of acid is formed and adding a soluble calcium salt.

5. In the manufacture of milk products, the process which comprises the steps of forming a solution of dried milk in water and adding a soluble calcium salt thereto.

6. In the manufacture of milk products, the process which comprises dissolving dried milk in water, inoculating the solution with suitable fermentative organisms, allowing the inoculated solution to stand at a suitable growing temperature until a creamy aroma develops, arresting the fermentation at this point, adding a soluble calcium salt, treating the solution with rennet to coagulate it and treating the curd by cheese-making processes.

7. In the manufacture of milk products, the process which comprises dissolving dried milk in water, inoculating the solution with aroma-producing organisms and with lactic organisms, allowing the inoculated solution to stand at a suitable growing temperature until a creamy aroma and flavor develop, arresting the fermentation at this point, adding a soluble calcium salt, treating the solution with rennet to coagulate it and treating the curd by cheese-making steps.

8. In the manufacture of milk products, the process which comprises treating a solution of dried milk in water with a soluble calcium salt, treating the solution with rennet to coagulate it and treating the curd by cheese-making steps.

In testimony whereof I have signed this specification in the presence of two subscribing witnesses.

JOHN AUGUSTUS JUST.

Witnesses:
W. V. BAUGHMAN,
WM. WATKINS.